US012532099B2

(12) United States Patent
Huang et al.

(10) Patent No.: US 12,532,099 B2
(45) Date of Patent: Jan. 20, 2026

(54) SOUNDING DEVICE

(71) Applicant: AAC Microtech (Changzhou) Co., Ltd., Jiangsu (CN)

(72) Inventors: Xingzhi Huang, Changzhou (CN); Wei Song, Changzhou (CN); Lubin Mao, Changzhou (CN); Fan Zhang, Changzhou (CN); Yun Tang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 152 days.

(21) Appl. No.: 18/645,412

(22) Filed: Apr. 25, 2024

(65) Prior Publication Data

US 2025/0168545 A1 May 22, 2025

Related U.S. Application Data

(63) Continuation of application No. PCT/CN2023/132619, filed on Nov. 20, 2023.

(51) Int. Cl.
*H04R 1/02* (2006.01)
*H04R 9/02* (2006.01)
*H04R 9/06* (2006.01)

(52) U.S. Cl.
CPC ............ *H04R 1/028* (2013.01); *H04R 1/025* (2013.01); *H04R 9/025* (2013.01); *H04R 9/06* (2013.01); *H04R 2400/03* (2013.01)

(58) Field of Classification Search
CPC ........ H04R 1/028; H04R 1/025; H04R 9/025; H04R 9/06; H04R 2400/03
USPC ........................................................ 381/162
See application file for complete search history.

(56) References Cited

U.S. PATENT DOCUMENTS

| | | | | |
|---|---|---|---|---|
| 8,461,728 B2 * | 6/2013 | Park | H02K 33/00 | 340/407.1 |
| 2023/0283958 A1 * | 9/2023 | Huang | H04R 7/04 | 381/396 |
| 2023/0328442 A1 * | 10/2023 | Jin | H04R 1/2811 | 381/412 |
| 2024/0080628 A1 * | 3/2024 | Mao | H04R 9/066 | |

* cited by examiner

*Primary Examiner* — Sean H Nguyen
(74) *Attorney, Agent, or Firm* — Wiersch Law Group

(57) ABSTRACT

A sounding device includes a shell, a speaker component and a motor component. The speaker component includes a vibration system and a magnetic circuit system, the motor component includes a vibrator and a stator driving the vibrator to vibrate in a second direction, the stator is fixed with the shell and arranged at outside of the magnetic circuit system along a second direction, the vibrator is suspended in the receiving cavity and arranged at outside of the stator along the second direction, the first direction is perpendicular to the second direction. The present invention provides a thinner and more efficient sounding device.

10 Claims, 3 Drawing Sheets

SOUNDING DEVICE

TECHNICAL FIELD

The present invention belongs to the technical field of electronic devices, and in particular, to a sounding device.

BACKGROUND

With the development of electronic technology, portable consumer electronic devices are becoming more and more popular, such as smartphones, handheld game consoles, and tablet computers. These electronic devices generally interact with users through sound playback and/or the vibratory sensation of vibration.

Currently, in the related art, sound playback and vibration of the electronic device are completed by two independent devices, namely a speaker and a motor. As a result, overall assembly of the electronic device is complicated, and more structures occupy more internal space of the electronic device.

Although there have been proposed to the speaker and vibration motor two-in-one program, for example, the use of moving coil structure, the speaker and the motor will share the same drive coil, the sound of the diaphragm and the vibrator of the motor in the same vibration direction, but this kind of program is in the same direction of the magnetic circuit to stack, resulting in a thicker device, and the moving coil structure is more complex, the speaker and the motor performance is weaker.

Therefore, there is a need to provide a new sounding device to solve the above problem.

SUMMARY

The present invention is intended to provide a sounding device to solve one of the technical problems existing in the prior art.

The present invention provides a sounding device, including a shell with a receiving cavity, a speaker component and a motor component accommodated in the receiving cavity, wherein the speaker component includes a vibration system and a magnetic circuit system driving the vibration system to vibrate in a first direction to generate sounds, the motor component includes a vibrator and a stator driving the vibrator to vibrate in a second direction, the stator is fixed with the shell and arranged at outside of the magnetic circuit system along a second direction, the vibrator is suspended in the receiving cavity and arranged at outside of the stator along the second direction, the first direction is perpendicular to the second direction.

As an improvement, the stator is a solenoid, the vibrator is a magnet.

As an improvement, the magnet includes three magnet units magnetized in segments, the three magnet units are sequentially arranged along an axial direction of the solenoid, each two adjacent magnet units have opposite polarity.

As an improvement, the magnet includes three solidly connected sub-magnets, the three sub-magnets are sequentially arranged along an axial direction of the solenoid, each two adjacent sub-magnets have opposite polarity.

As an improvement, the stator includes two solenoids symmetrically arranged at both sides of the magnetic circuit system along the second direction, the vibrator includes two magnets symmetrically arranged at outside of the two solenoids along the second direction.

As an improvement, the sounding device further includes an elastic connecting member and a mass block, a first end of the elastic connecting member is fixed with the shell and a second end of the elastic connecting member is connected to the mass block to suspend the mass block in the receiving cavity; the vibrator is fixedly connected to the mass block.

As an improvement, the magnetic circuit system includes a lower clamping plate fixed to the shell, a first main magnet arranged on a side of the lower clamping plate facing the vibration system, and an auxiliary magnet arranged around an outer side of the first main magnet, the first main magnet and the auxiliary magnet are providing with an opposite polarity, a magnetic gap is provided between the first main magnet and the auxiliary magnet, the magnetic circuit system further includes a second main magnet arranged on a side of the first main magnet away from the lower clamping plate, magnetic polarities of the first main magnet and the second main magnet opposite to each other are the same, the stator is arranged at outside of the lower clamping plate along the second direction.

As an improvement, the sounding device further includes a pole plate located on the auxiliary magnet, two opposite sides of the pole plate are provided with avoiding through slots corresponding to the motor component along the second direction, the pole plate is provided with an avoiding through hole corresponding to the magnetic gap and the first main magnet.

As an improvement, the sounding device further includes a support skeleton fixed with the pole plate, the vibration system includes a diaphragm arranged between the support skeleton and the second main magnet, and a voice coil which drives the diaphragm to produce sound, the voice coil is inserted into the magnetic gap.

As an improvement, the sounding device further includes a flexible circuit board connected to the support skeleton, the flexible circuit board is electrically connected to the voice coil, a bottom wall of the shell is provided with a through-hole corresponding to the lower clamping plate, and a top wall of the shell is formed with a recessed portion against the second main magnet.

DESCRIPTION OF EMBODIMENTS

Figure 1:
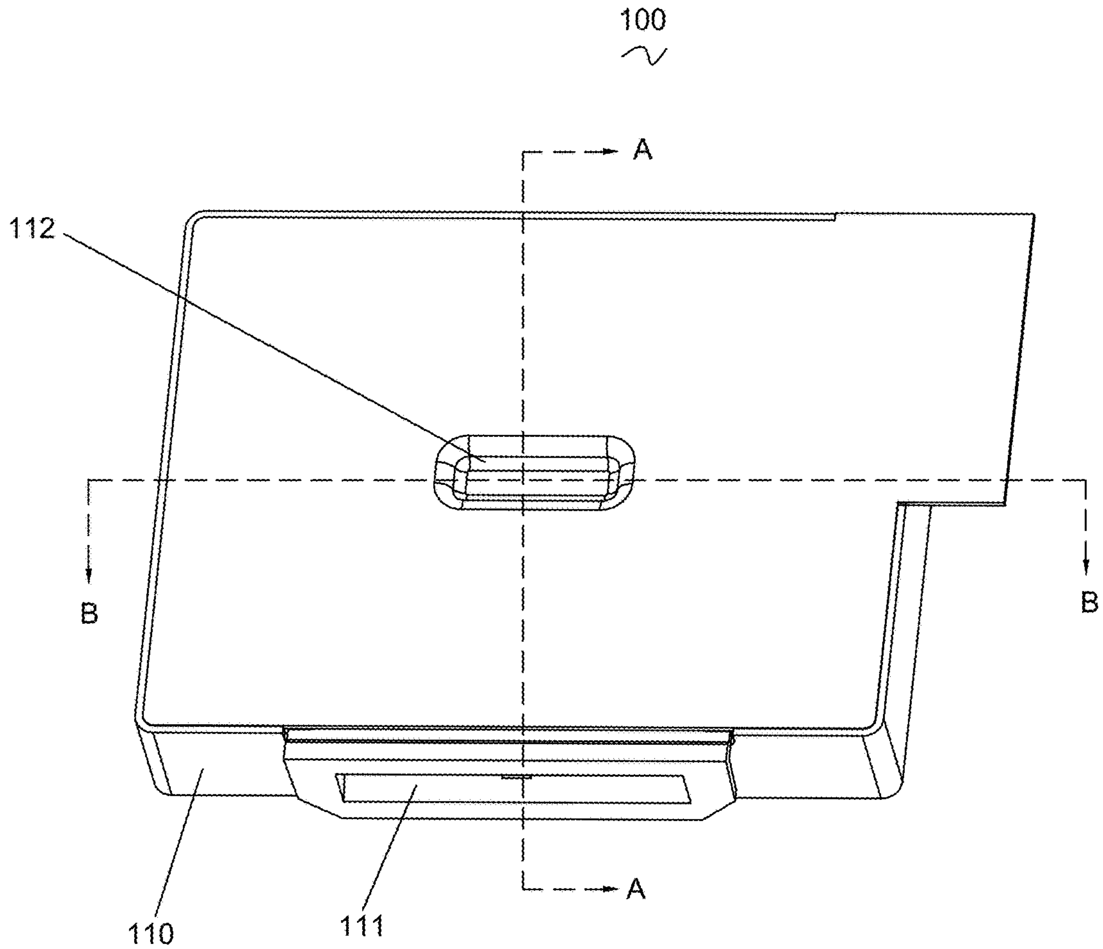
FIG. 1 is an isometric view of a sounding device according to an embodiment of the present invention.

In order to enable those skilled in the art to better understand the technical solutions of the present invention, the present invention will be described in further detail below in conjunction with the accompanying drawings and specific embodiments. Obviously, the described embodiments are some, but not all, of the embodiments of the present invention. Based on the described embodiments of the present invention, all other embodiments obtained by those of ordinary skill in the art without creative efforts fall within the protection scope of the present invention.

As shown in FIG. 1 to FIG. 5, a sounding device 100 includes a shell 110 having a receiving cavity, a speaker component 120 and a motor component 130 accommodated in the receiving cavity. The speaker component 120 includes a vibration system 121 and a magnetic circuit system 122 driving the vibration system 121 to vibrate in a first direction to generate sounds. The motor component 130 includes a vibrator 131 and a stator 132 driving the vibrator 131 to vibrate in a second direction. The stator 132 is fixed with the shell 110 and arranged at outside of the magnetic circuit system 122 along a second direction, the vibrator 131 is suspended in the receiving cavity and arranged at outside of the stator 132 along the second direction, the first direction is perpendicular to the second direction.

Figure 3:
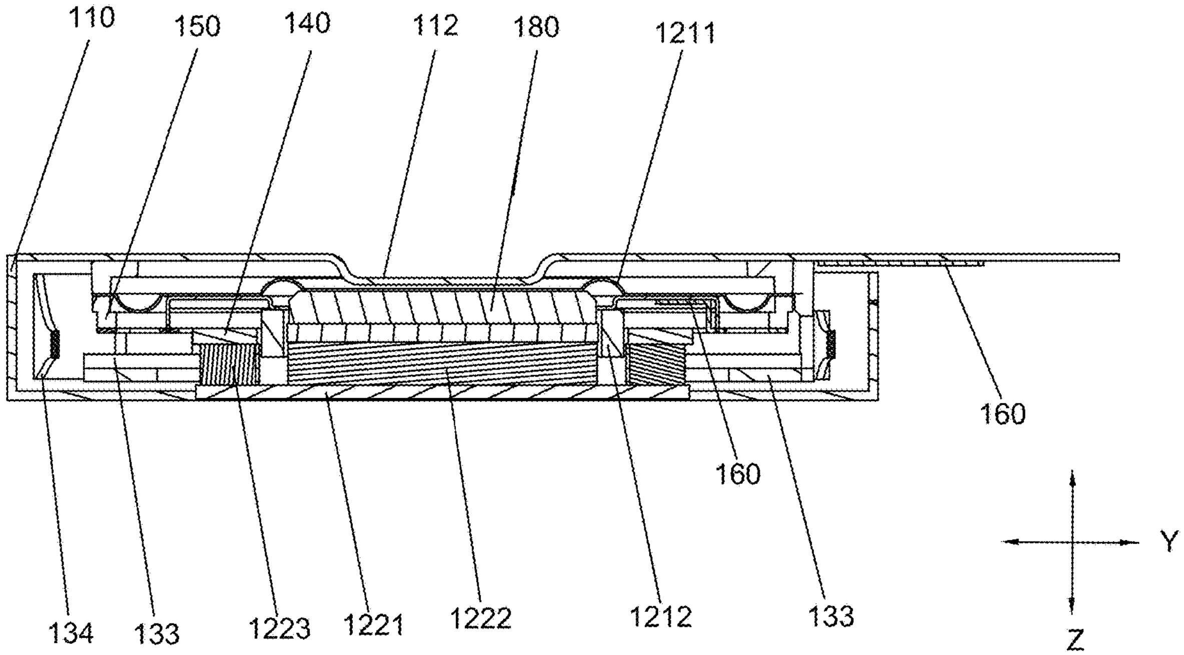
FIG. 3 is a schematic sectional view taken along a profile B-B in FIG. 1 according to the embodiment of the present invention.

In this embodiment, the first direction refers to a direction along a Z-axis, as indicated by the arrow in FIG. 3 pointing to a Z-axis direction. The second direction refers to the direction along a Y-axis, as indicated by the arrow in FIG. 3 pointing to the Y-axis direction. That is, the vibration system vibrates along a Z-axis direction to form a Z-axis sounding vibration, the vibrator vibrates along a Y-axis direction to form a Y-axis vibrator vibration. The motor component arranged at both sides of the magnetic circuit system along the Y-axis direction can reduce the thickness of the sounding device in the Z-axis direction, significantly reduce the total thickness of the sounding device and enable the sounding device to satisfy the requirement of ultra-thinness in the Z-axis direction.

Figure 5:
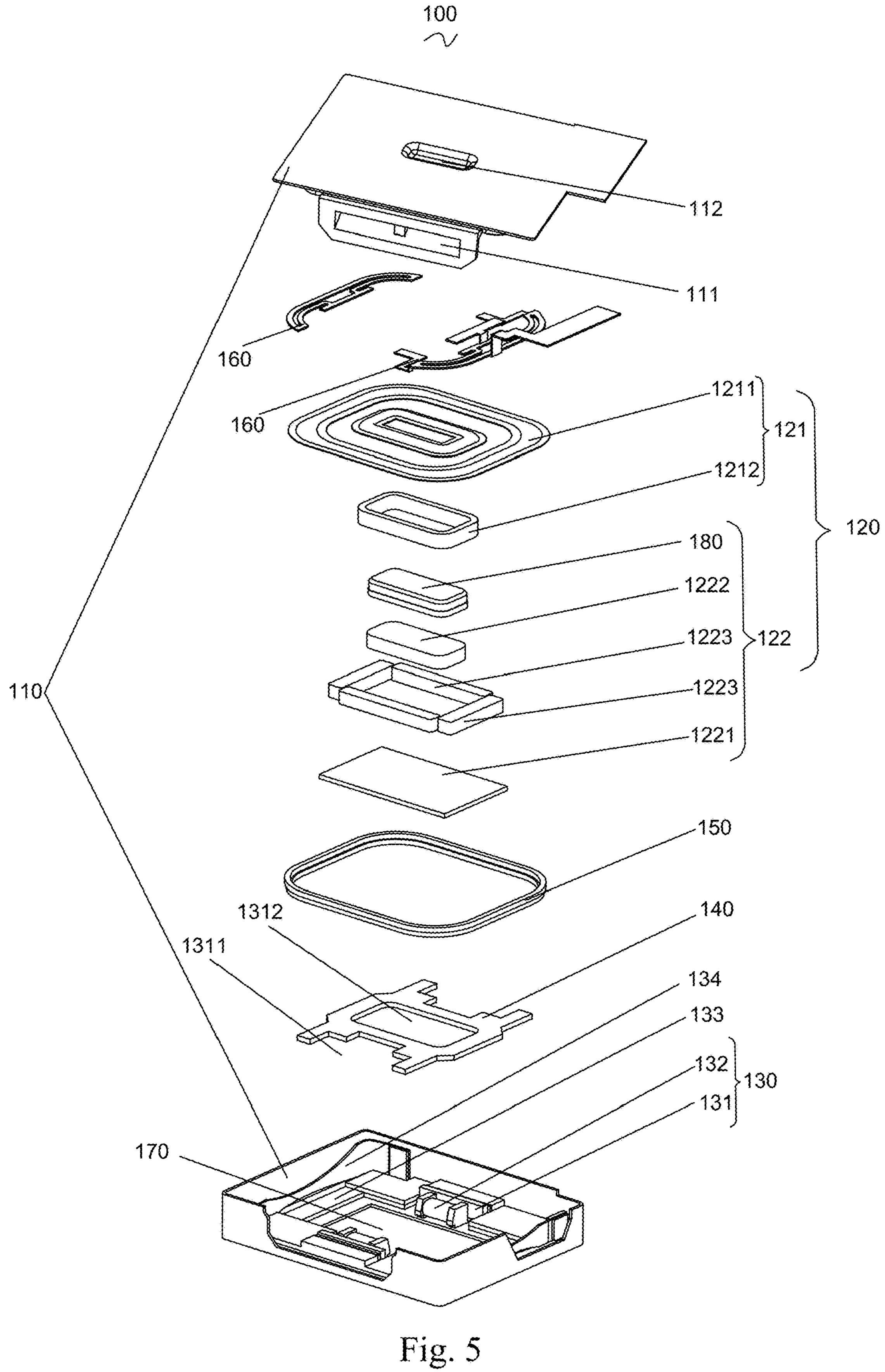
FIG. 5 is an exploded view of the sounding device according to the embodiment of the present invention.

Specifically, as shown in FIGS. 1 and 5, the shell 110 includes an upper shell and a lower shell, and the upper shell and the lower shell enclose to form the shell 110 with the receiving cavity. The speaker component 120 and the motor component 130 are both located in the receiving cavity of the shell 110. The upper shell is provided with a sound-generating port 111, and the magnetic circuit system 122 drives the vibration system 121 to vibrate sounds in the first direction and to generate sounds output through the sound-generating port 111. Both the vibration system 121 and the magnetic circuit system 122 are located in the receiving cavity of the shell 110 along the first direction. The stator 132 is fixed with a bottom wall of the lower shell and arranged at outside of the magnetic circuit system 122 along the second direction, the vibrator 131 is suspended in the receiving cavity and arranged at outside of the stator 132 along the second direction, the stator 132 fixed with the bottom wall of the lower shell drives the vibrator 131 the corresponding vibrator 131 to vibrate.

The sounding device 100 can vibrate to generate sounds in the first direction by the speaker component arranged along the first direction, and can vibrate in the second direction by the motor component arranged outside the speaker component along the second direction. In addition, the motor component arranged outside of the speaker component along the second direction could reduce the thickness of the sounding device in the first direction, avoid stacking of the speaker component and the motor component in the same direction, effectively reduce the total thickness of the sounding device, and enable the sounding device to meet the requirement of ultra-thinness in the first direction.

Figure 2:
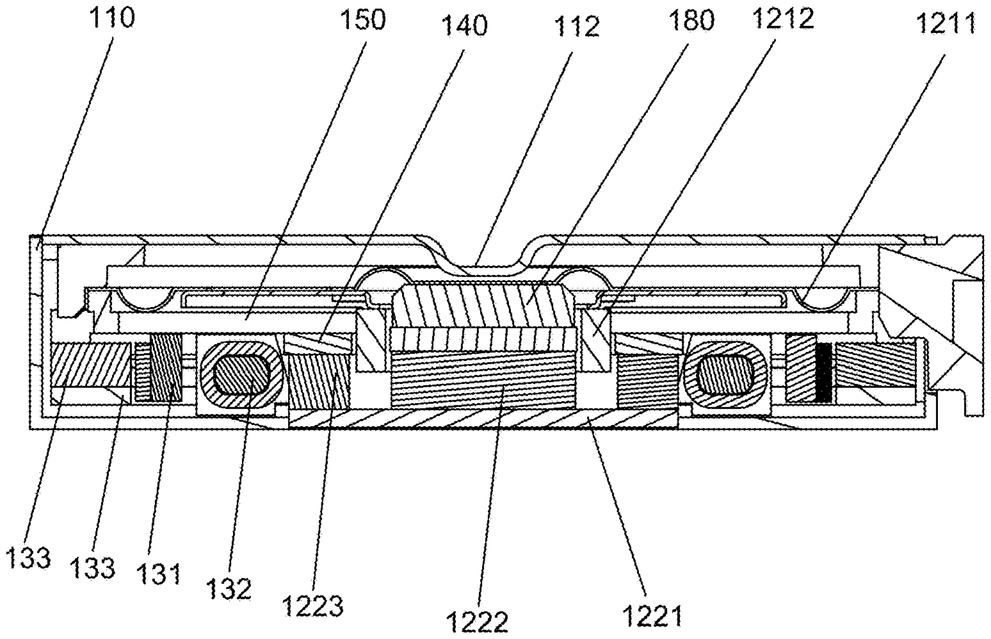
FIG. 2 is a schematic sectional view taken along a profile A-A in FIG. 1 according to the embodiment of the present invention.

Further, as shown in the FIG. 2 and FIG. 5, the stator 132 is a solenoid, the vibrator 131 is a magnet.

Specifically, as shown in the FIG. 2 and FIG. 5, the stator 132 is provided as a solenoid and fixed with the shell 110, an axial direction of the solenoid is perpendicular to the first direction and parallel to the second direction, that is, the solenoid is horizontally fixed with an inner bottom of the lower shell along the axial direction of the solenoid. The vibrator 131 is provided as a magnet and suspended in the receiving cavity of the shell 110, an axis of the magnet and the axis of the solenoid are parallel to each other and a pole plate is sandwiched between the magnet and the side wall of the lower shell. As the magnet is driven to vibrate in the second direction by a fixedly provided solenoid, the dynamic magnetic structure is arranged in a simple and reliable form, which makes the vibration more stable, does not interfere with the sounding device, will improve the performance of the sounding device.

In one embodiment, the magnet could include three magnet units magnetized in segments, the three magnet units are sequentially arranged along the axial direction of the solenoid, each two adjacent magnet units have opposite polarity. That is, the polarity of one magnet unit located in the middle position is opposite to the polarity of the other two magnet units located on both sides of the magnet unit. Magnet is set up in a single segmented magnetization system. In another embodiment, the magnet includes three solidly connected sub-magnets, the three sub-magnets are sequentially arranged along the axial direction of the solenoid, each two adjacent sub-magnets have opposite polarity. That is, the polarity of one sub-magnet unit located in the middle position is opposite to the polarity of the other two sub-magnet units located on both sides of the magnet. The magnet is assembled separately.

The stator 132 includes two solenoids symmetrically arranged along the second direction at both sides of the magnetic circuit system 122. The vibrator 131 includes two magnets symmetrically arranged at an outside of the two solenoids along the second direction.

The vibrator 131 includes two magnets, the two magnets are symmetrically arranged at opposite sides of the magnetic circuit system 122 respectively along the second direction. The stator 132 includes two solenoids, the two solenoids are corresponding to the two magnets respectively, and the two solenoids are symmetrically arranged between the magnetic circuit system 122 and the corresponding two magnets respectively along the second direction. Therefore, the overall construction of the sounding device could be made more balanced and stable, and the sounding device has stable vibration along the second direction, which improves the durability of the sounding device.

The sounding device 100 further includes an elastic connecting member 134 and a mass block 133. A first end of the elastic connecting member 134 is fixed with the shell 110 and a second end of the elastic connecting member 134 is connected to the mass block 133 to suspend the mass block 133 in the receiving cavity. The vibrator 131 is fixedly connected to the mass block 133.

Specifically, the elastic connecting member 134 surrounds the inner bottom wall of the lower shell, the first end of the elastic connecting member 134 is fixed with the inner bottom wall of the lower shell, and the second end of the elastic connecting member 134 is provided with a mass block 133 which is fixed with the connecting member 134 and connected with the vibrator 131. Therefore, the mass block and the vibrator connected with the mass block could be suspended in the receiving cavity of the shell. The weighting of the vibrator through the cooperation of the elastic connecting member and the mass block can not only strengthen the vibration effect of the vibrator and improve the acoustic vibration performance of the sounding device, but also balance the vibration sway of the vibrator and improve the stability of the sounding device.

There are two elastic connecting members 134, and the two elastic connecting members 134 are arranged centrosymmetrically along the axial direction of the vibrator 131 at opposite sides of the vibrator 131, one end of each of the elastic connecting members 134 is connected to the shell 110, and the other end is connected to the mass block 133. The two elastic connecting members may be provided as springs of L-shapes, and of course, the two elastic connecting members may also be provided as springs of V-shapes or C-shapes, this embodiment does not impose a specific limitation in this regard. The acoustic vibration performance of the sounding device can be further enhanced by the elastic connecting member.

Refer to the FIG. 2 to FIG. 5, the magnetic circuit system 122 includes a lower clamping plate 1221 fixed with the shell 110, a first main magnet 1222 arranged on a side of the lower clamping plate 1221 facing the vibration system 121, and an auxiliary magnet 1223 surrounding an outer side of the first main magnet 1222. The first main magnet 1222 and the auxiliary magnet 1223 are providing with an opposite polarity, a magnetic gap is provided between the first main magnet 1222 and the auxiliary magnet 1223. The magnetic circuit system 122 further includes a second main magnet 180 located at a side of the first main magnet 1222 away from the lower clamping plate 1221. The vibrator 132 is arranged at the outer side of the lower clamping plate 1221 in the second direction.

As shown in FIGS. 2 to 5, the bottom wall of the lower shell is provided with a through-hole 170, the lower clamping plate 1221 is corresponding with the through-hole 170. The first main magnet 1222 and the auxiliary magnet 1223 accommodated in the receiving cavity of the shell 110 are fixed with the lower clamping plate 1221. It is noted that a recessed portion 112 is also formed against the second main magnet 180 in the top wall of the upper shell.

As the first main magnet and the auxiliary magnet are arranged on the lower clamping plate, the lower clamping plate does not need to be partially excised to avoid the motor coils, which in turn enables the magnetic circuit to be completely closed, with a better magnetic circuit, higher efficiency of the magnetic circuit structure, and improved overall performance of the sounding device.

As shown in FIGS. 2 to 5, the sounding device 100 further includes a pole plate 140 attached on the auxiliary magnet 1223. The pole plate 140 is provided with an avoidance through hole 1312 along the first direction corresponding to the magnetic gap and the first main magnet 1222.

Further, the pole plate 140 is arranged on the auxiliary magnet 1223 at a side facing to the vibration system 121. Two opposite sides of the pole plate 140 are respectively provided with give way through slots 1311 along the second direction, and when the pole plate 140 is fixed with the auxiliary magnet 1223, the give way through slots 1311 provided on the opposite sides of the pole plate 140 is corresponding to avoiding the motor component 130, so that the pole plate 140 will not interfere with the stator 132 and the vibrator 131. The pole plate 140 is provided with a give way through hole 1312 along the first direction, and when the pole plate 140 is fixed to the auxiliary magnet 1223, the give way through hole 1312 provided on the pole plate 140 corresponds to yielding to the magnetic gap and the first main magnet 1222, so that the magnetic gap and the first main magnet 1222 are located in the enclosing range of the give way through hole 1312, and the voice coil can drive the vibration of the diaphragm to produce sounds in the magnetic gap along the first direction.

The sounding device 100 further includes a support skeleton 150 fixed with the pole plate 140, the vibration system 121 includes a diaphragm 1211 fixed between the support skeleton 150 and the second main magnet 180, and a voice coil 1212 driving the diaphragm 1211 to generate sounds, the voice coil 1212 is insert in the magnetic gap.

One end of the support skeleton 150 is fixedly connected to the pole plate 140, and the other end is supported on an edge region of the diaphragm 1211. A central region of the diaphragm 1211 is provided with an opening, the size and dimension of the opening corresponds to the size and dimension of the second main magnet 180. The second main magnet 180 is sandwiched between the diaphragm 1211 and the first main magnet 1222, and the pole plate is sandwiched between the second main magnet 180 and the first main magnet 1222. One end of the second main magnet 180 is connected to the first main magnet 1222 via the pole plate, and the other end is correspondingly abutted against the opening provided in the diaphragm 1211. The voice coil 1212 is connected to the diaphragm 1211 and suspended in the magnetic gap formed by the first main magnet 1222 and the secondary magnet 1223, and when the voice coil 1212 vibrates up and down in the first direction in the magnetic gap, the voice coil 1212 can drive the diaphragm 1211 to vibrate up and down along the first direction to produce sound, and the sound can be transmitted through the sound-generating port 111 provided in the upper shell.

The diaphragm could be suspended in the receiving cavity of the shell via the support skeleton and the second main magnet.

Figure 4:
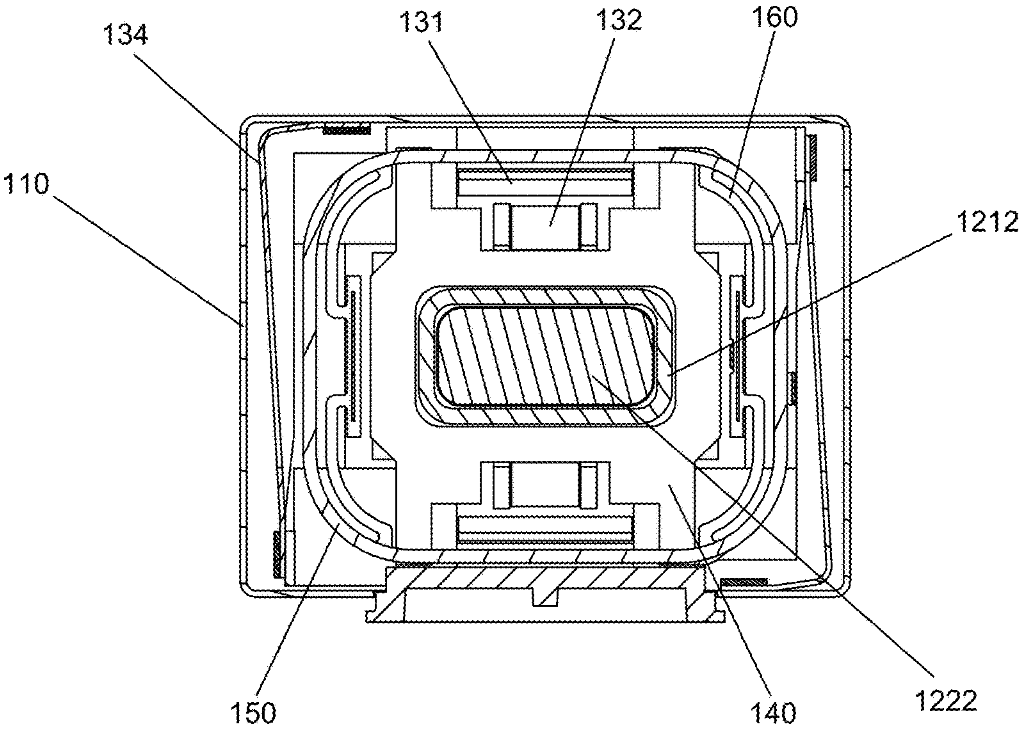
FIG. 4 is a top view of the sounding device according to the embodiment of the present invention.

As shown in FIGS. 3 to 5, the sounding device 100 further includes a flexible circuit board 160 connected to the support skeleton 150, the flexible circuit board 160 is electrically connected to the voice coil 1212. In one embodiment, the flexible circuit board 160 is provided as two flexible circuit boards symmetrically arranged at both sides of the stator 132 along the axial direction of the stator 132, and is connected to the support skeleton 150, the two flexible circuit boards 160 are electrically connected to the voice coil 1212 for power supply.

It may be understood that the above embodiments are only exemplary embodiments adopted to illustrate the principles of the present invention, but the present invention is not limited thereto. For those of ordinary skill in the art, various modifications and improvements can be made without departing from the spirit and essence of the present invention, and these modifications and improvements are also regarded as the protection scope of the present invention.

What is claimed is:

1. A sounding device, comprising, a shell with a receiving cavity, a speaker component and a motor component accommodated in the receiving cavity, wherein the speaker component comprises a vibration system and a magnetic circuit system driving the vibration system to vibrate in a first direction to generate sounds, the motor component comprises a vibrator and a stator driving the vibrator to vibrate in a second direction, the stator is fixed with the shell and arranged at outside of the magnetic circuit system along a second direction, the vibrator is suspended in the receiving cavity and arranged at outside of the stator along the second direction, the first direction is perpendicular to the second direction.

2. The sounding device as described in claim 1, wherein the stator is a solenoid, the vibrator is a magnet.

3. The sounding device as described in claim 2, wherein the magnet comprises three magnet units magnetized in segments, the three magnet units are sequentially arranged along an axial direction of the solenoid, each two adjacent magnet units have opposite polarity.

4. The sounding device as described in claim 2, wherein the magnet comprises three solidly connected sub-magnets, the three sub-magnets are sequentially arranged along an axial direction of the solenoid, each two adjacent sub-magnets have opposite polarity.

5. The sounding device as described in claim 1, wherein the stator comprises two solenoids symmetrically arranged at both sides of the magnetic circuit system along the second direction, the vibrator comprises two magnets symmetrically arranged at outside of the two solenoids along the second direction.

6. The sounding device as described in claim 1, wherein the sounding device further comprises an elastic connecting member and a mass block, a first end of the elastic connecting member is fixed with the shell and a second end of the elastic connecting member is connected to the mass block to suspend the mass block in the receiving cavity; the vibrator is fixedly connected to the mass block.

7. The sounding device as described in claim 1, wherein the magnetic circuit system comprises a lower clamping plate fixed to the shell, a first main magnet arranged on a side of the lower clamping plate facing the vibration system, and an auxiliary magnet arranged around an outer side of the first main magnet, the first main magnet and the auxiliary magnet are providing with an opposite polarity, a magnetic gap is provided between the first main magnet and the auxiliary magnet, the magnetic circuit system further comprises a second main magnet arranged on a side of the first main magnet away from the lower clamping plate, magnetic polarities of the first main magnet and the second main magnet opposite to each other are the same, the stator is arranged at outside of the lower clamping plate along the second direction.

8. The sounding device as described in claim 7, further comprises a pole plate located on the auxiliary magnet, two opposite sides of the pole plate are provided with avoiding through slots corresponding to the motor component along the second direction, the pole plate is provided with an avoiding through hole corresponding to the magnetic gap and the first main magnet.

9. The sounding device as described in claim 8, further comprises a support skeleton fixed with the pole plate, the vibration system comprises a diaphragm arranged between the support skeleton and the second main magnet, and a voice coil which drives the diaphragm to produce sound, the voice coil is inserted into the magnetic gap.

10. The sounding device as described in claim 9, further comprises a flexible circuit board connected to the support skeleton, the flexible circuit board is electrically connected to the voice coil, a bottom wall of the shell is provided with a through-hole corresponding to the lower clamping plate, and a top wall of the shell is formed with a recessed portion against the second main magnet.

* * * * *